(No Model.)
A. SEARLS.
CLIP FOR DASH BARS.
No. 475,811. Patented May 31, 1892.
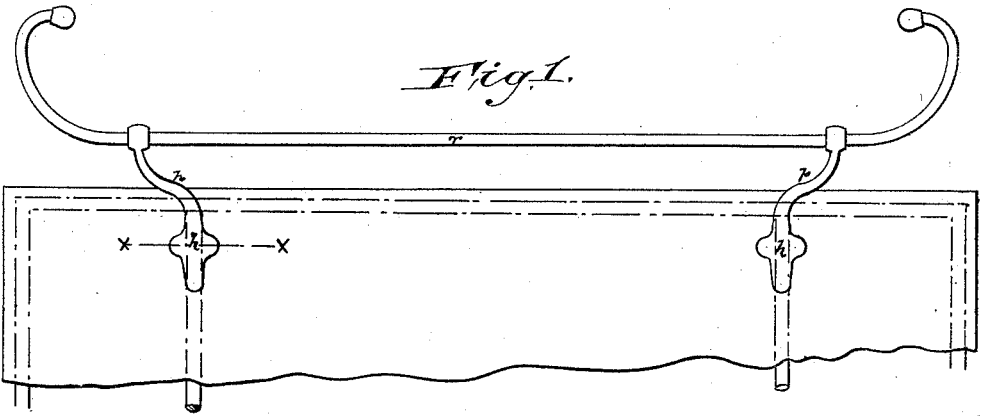
Fig. 1.
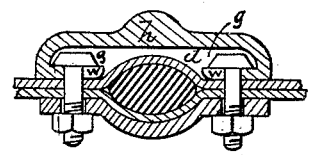
Fig. 2.
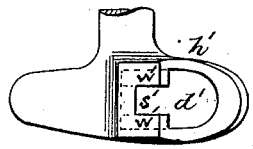
Fig. 6.
Fig. 3.
Fig. 4.
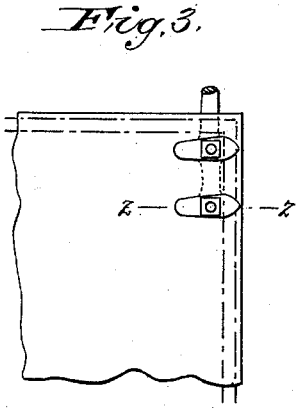
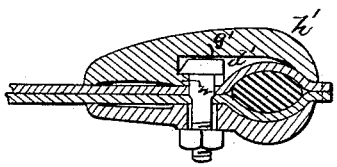
Fig. 5.
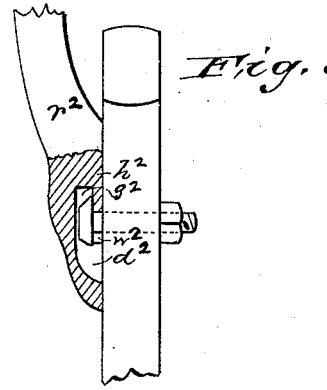
Attest,
W. M. Benjamin
Peter P. Vermilyea
Inventor,
Anson Searls
by A. G. N. Vermilyea
his Attorney.
THE NORRIS PETERS CO., PHOTO-LITHO., WASHINGTON, D. C.

UNITED STATES PATENT OFFICE.

ANSON SEARLS, OF NEWARK, NEW JERSEY.

CLIP FOR DASH-BARS.

SPECIFICATION forming part of Letters Patent No. 475,811, dated May 31, 1892.

Application filed February 1, 1892. Serial No. 419,914. (No model.)

*To all whom it may concern:*

Be it known that I, ANSON SEARLS, a citizen of the United States of America, and a resident of Newark, in the county of Essex and State of New Jersey, have invented new and useful Improvements in Clips, of which the following is a specification, reference being had to the accompanying drawings, forming part of the same, in which—

Figure 1 is a front elevation of a dash-board with a rail secured thereto by a clip embodying my invention. Fig. 2 is a cross-sectional view on line $x$ $x$, Fig. 1, of the clip, the frame-iron, and the leather. Fig. 3 is a rear elevation of part of a dash board or frame with a portion of a rail secured thereto by two clips of modified form which are integral with the rail. Fig. 4 is a cross-sectional view on line $z$ $z$ of Fig. 3, showing the clip, the frame-iron, the clamping-piece, and the leather. Fig. 5 is an elevation, partly in section, of a wooden dash-board and a rail with the clip formed thereon; and Fig. 6 is a rear face view of the clip part of the device shown in Figs. 3 and 4.

In the manufacture of devices for attaching rails to dash frames or boards it has been customary to cast the posts and secure them to the frame by wrought bolts or screws, which were inserted through apertures in the posts sufficiently large to permit the insertion of the shank of the bolt and yet prevent the passage of its head. In another construction the shank of the bolt has been formed integral with the post. The trade requires that the parts should be highly finished, usually plated with silver, nickel, or gold, the bolt-head as well as the post, which necessitates much detail work and causes considerable outlay, while if the bolt should break or a thread wear off in use no ordinary bolt can be substituted by the workman applying the rail, but a new one similarly finished must be secured if the bolt is separate, while if it is integral with the rail or post such injury renders the whole part useless. To avoid these difficulties has been my object, and to that end I have succeeded in devising the clip shown, which is free from the above objections. The bolt is removable, and yet its head is not visible and need not be finished, and I have so combined it with the other parts that in use it will not work out of its proper position.

It consists of a holding part $h$, which embraces or bears against the frame of the dash or the covering, a depression $d$ large enough to receive the head of the bolt, (located in the bearing-face of the clip,) a recess $g$, leading sidewise from depression $d$ and also large enough to permit the movement in it of the bolt-head, a slot $s$ in one wall of said recess as wide as the shank of the bolt, but not so wide as the head, and in use a stop which prevents the head from escaping sidewise out of the groove when the clip is secured in place. The portions of the wall of recess $g$ on the slotted side form flanges or wings $w$, which inclose the flange of the bolt-head, and upon them said flange bears in holding the rail or post to the frame.

As will be manifest, any bolt of suitable size may be used with this clip, and, its head being entirely concealed when the post $p$ or rail $r$ is in position, it need not be finished at all. If broken or worn, another may be readily applied, and the face of the clip once finished remains so regardless of accidents to the bolt.

In clips to be applied to frames I locate the depression $d$ at the point where the iron of the frame will lie when the parts are in position, and a curve or space for it is made in the clip, the result being that when applied the frame substantially fills the depression and the bolt cannot move sidewise out of the recess $g$ or the clip over the bolt-head, as it might by reason of continuous jar or a strain upon the rail if no such provision were made. The same object may be attained in forms like that of Fig. 5 by making the depression $d^2$ therein of a little less width in the direction of the recess $g^2$ than the width of the bolt-head. Then to insert the bolt-head the bolt must be held inclined at an angle less than a right angle to the rail or clip, and when applied to the frame and tightened by the nut it cannot turn to such angle and the head and clip will be limited in their relative movements, so that the clip cannot move far enough to one side to release the flange of the head from the wings $w^2$. When two posts are used secured firmly to the rail, the same object may be attained by turning the closed ends of the recesses $g'$ in each toward the other, when those closed ends will of themselves act as stops.

The mode of application is too plain to need further description.

What I claim, and desire to secure by Letters Patent, is—

1. A clip-bar adapted to bear upon a dash-frame and provided with a recess on its inner side, a slotted recess extending therefrom adapted to inclose and conceal a bolt-head, one or more re-entrant wings adapted to inclose and hold the flange of the bolt-head, and means for securing the same, all substantially as set forth.

2. A clip-bar adapted to bear upon a dash-frame and provided with a recess on its inner side, a slotted recess extending therefrom adapted to inclose and conceal a bolt-head having one or more re-entrant wings adapted to inclose and hold the flange of the bolt-head, means for securing the same, and a stop arranged substantially as described, whereby the movement of the clip-bar will be limited, all substantially as set forth.

In testimony that I claim the foregoing as my invention I have signed my name, in presence of two witnesses, this 29th day of January, 1892.

ANSON SEARLS.

Witnesses:
 CHARLES W. BENJAMIN,
 J. J. ADGATE.